United States Patent [19]
Clark

[11] 3,985,671
[45] Oct. 12, 1976

[54] SCALE CONTROL AGENTS
[75] Inventor: Herbert D. Clark, Burbank, Calif.
[73] Assignee: Universal Oil Products Company, Des Plaines, Ill.
[22] Filed: Sept. 26, 1974
[21] Appl. No.: 509,506

[52] U.S. Cl............................. 252/180; 210/58; 252/DIG. 11
[51] Int. Cl.$^2$.................. C02B 5/04; C02B 5/06
[58] Field of Search ........... 252/180, 179, 545, 547, 252/DIG. 11, 528; 210/58

[56] References Cited
UNITED STATES PATENTS
3,336,221  8/1967  Ralston ................................ 210/58
3,749,759  7/1973  Freyhold et al...................... 252/528

Primary Examiner—Mayer Weinblatt
Assistant Examiner—Edith R. Buffalow
Attorney, Agent, or Firm—James R. Hoatson, Jr.; Raymond H. Nelson; William H. Page, II

[57] ABSTRACT

A synergistic blend of a polyaminoalkylenephosphonate and a polyquaternary ammonium chloride compound is used as a scale control agent for recirculating water cooling equipment.

6 Claims, No Drawings

SCALE CONTROL AGENTS

BACKGROUND OF THE INVENTION

When utilizing recirculating water cooling systems or other systems wherein water is present, it is imperative to prevent water-formed deposits such as scale from building up inside the system. By preventing this buildup of water-formed deposits, it will permit the equipment to be operated with maximum efficiency. For example, it has been calculated that if a calcium carbonate scale 1/32 inch thick is allowed to form on the inside of a system, it will cause approximately an 8% loss of efficiency in the operation of the equipment. In addition, if the buildup of scale is allowed to progress to a certain point, it is possible that actual damage to the equipment or system can occur because of overheated components and the plugging of recirculating channels. Furthermore, an indiscriminate use of acid descalers to remove the scale could cause corrosive damage to the equipment.

In the prior art various chemicals are known for use as inhibitors in the formation of scale, the best known of these compounds being the class of compounds known as molecularly dehydrated phosphates, some specific examples of these compounds being sodium tripolyphosphate, sodium hexametaphosphate, etc. The function of these prior art chemicals is to prevent the formation of scale by adsorption onto the central core of a crystal lattice thus preventing further growth of the crystal. If the crystal does develop to any further degree, it is distorted to such a degree that it presents no recognizable geometrical pattern. Since adsorption onto the crystal core is occurring, it becomes readily apparent that only small amounts of the scale inhibitor are needed in order to prevent the formation of potentially large amounts of scale. For example, sodium hexametaphosphate or sodium tripolyphosphate present in an amount of 2 ppm, will prevent scaling in waters which contain as much as 400 to 500 ppm hardness as calcium carbonate and from 400 to 500 ppm of total alkalinity as calcium carbonate. However, the aforementioned phosphate compounds possess some undesirable characteristics which retard their efficiency for use as scale control agents. One undesirable characteristic which they possess is that they hydrolyze in water to form the ineffective ortho-phosphates. The rate of hydrolysis of these compounds such as the sodium tripolyphosphate or sodium hexametaphosphate compound is in direct proportion to temperature, the hardness content of the water as well as to the pH range of the water. Furthermore, the orthophosphate which is formed by the hydrolysis can combine with the calcium hardness to form a calcium phosphate scale or sludge which is equally undesirable.

As hereinafter set forth in greater detail, it has now been discovered that a synergistic blend of certain polymers may be formed which may be used as a substitute for the known phosphate compounds and which will act as a scale control agent when used in recirculating water cooling systems as well as other water systems.

This invention relates to novel salts of compounds which may be used as scale control agents. More specifically the invention is concerned with a synergistic blend of a polyaminoalkylenephosphonate compound and a polyquaternary ammonium chloride compound of the types hereinafter set forth in greater detail whereby the formation of scale may be retarded or prevented. 16

It has now been discovered that two distinct and separate polymeric compounds may be admixed to form a synergistic blend which will act to control or prevent the formation of scale in recirculating water systems. The compounds which are used will act to prevent the formation of scale to a degree which is as good as or better than the dehydrated phosphates which are used in the prior art, and furthermore, will not display the disadvantages which are inherent when utilizing the aforementioned dehydrated phosphates. The compounds which are utilized to form the synergistic mixture will generally fall into the polymeric class of compounds which possess medium to high molecular weights, that is, molecular weights ranging from approximately 800 to over 5 million.

It is therefore an object of this invention to provide a synergistic blend of polymeric compounds which act as scale control agents.

A further object of this invention is to provide a method for preventing the formation of scale in a water recirculating system by adding thereto a synergistic mixture of a polyaminoalkylenephosphonate and a polyquaternary ammonium chloride compound.

In one aspect an embodiment of this invention resides in the synergistic mixture of from about 90% to about 30% by weight of a polyaminoalkylenephosphonate and from about 10% to about 70% by weight of a polyquaternary ammonium chloride.

A further embodiment of this invention resides in a method of controlling scale deposits in a water recirculating system which comprises adding thereto a synergistic mixture of from about 90% to about 30% by weight of a polyaminoalkylenephosphonate and from about 10% to about 70% by weight of a polyquaternary ammonium chloride.

A specific embodiment is found in a synergistic mixture containing from about 90% to about 30% by weight of polyaminomethylenephosphonate and from about 10% to about 70% by weight of poly[oxyethylene(dimethyliminio)ethylene(dimethyliminio)ethylenedichloride].

Other objects and embodiments will be found in the following further detailed description of the present invention.

As hereinbefore set forth, the present invention is concerned with a synergistic blend of two polymeric compounds which act to control the scale on water circulating or recirculating systems. The scale which is formed on the surfaces of water circulating or recirculating systems usually comprises salts of polyvalent ions such as calcium sulfate, calcium carbonate, the corresponding barium salts, etc. The compounds which are used to prevent the formation of scale and the attendant problems created by said formation, attribute the actions thereof by increasing the saturation point of the salts responsible for the formation of scale, by slowing down the rate of crystal formation, by distorting the crystalline structure and by effecting the dispersion or non-adherency to surfaces by the polyvalent ion salts.

The aforesaid properties of the synergistic mixture of the compounds of the present invention to be able to increase the saturation point is important to the water treatment industry inasmuch as the greater the increase in the saturation point, the more efficient and economical it becomes to effectively treat a water recirculating system or other equipment that can be adversely effected by the formation of scale.

The synergistic blend of the present invention will comprise a mixture of (1) a phosphonate of the type hereinafter set forth in greater detail, said phosphonate being present in an amount in the range of from about 90% to about 30% by weight of the mixture and (2) a polyquaternary ammonium chloride which is present in the mixture in a range of from about 10% to about 70% by weight. Of the phosphonates, the preferred compounds comprise a polyaminoalkylenephosphonate. The polyaminoalkylenephosphonates may comprise a polyaminomethylenephosphonate, polyaminoethylenephosphonate, polyaminopropylenephosphonate, etc. Numerous polyaminomethylenephosphonates are described in U.S. Pat. No. 3,336,221 and are incorporated herein by reference. The polyaminomethylenephosphonate may be illustrated by the following structure:

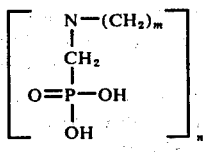

where $m$ is 1 to 3 and $n$ is 3 to 15. Also included are the ammonium or alkaline metal salts thereof, or mixtures of these. In a preferred embodiment, $n$ in the above structure is from about 8 to about 12. Typical properties of a preferred polyaminomethylenephosphonate, in which $m$ in the above structure is 2 and $n$ is about 10, is stated to be substantially as follows.

TABLE I

| Item | Description |
|---|---|
| Phosphorus, wt. % | 10 |
| pH | 1.0 |
| Density, pounds/gallon | 10.5 |
| Viscosity at 20° C., cps | 96 |
| Color | Dark Amber |
| Molecular Weight | About 1200 |

The polyaminomethylenephosphonate will be utilized as such or prepared as a solution or dispersion in a suitable solvent, emulsifier, dispersant or the like.

The other component of the synergistic blend of the present invention will comprise a polyquaternary ammonium chloride. In the preferred embodiment of the invention, the quaternary ammonium chloride will possess the structural formula:

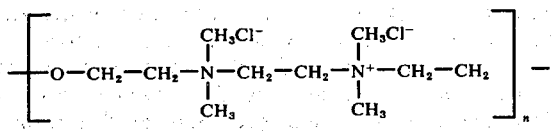

With $n$ equal to 13–17. Its formula name is poly[oxyethylene(dimethyliminio)ethylene(dimethyliminio)ethylenedichloride].

It is to be understood that the aforementioned phosphonate or phosphonic acid compounds and quaternary ammonium chloride compounds are only representative of the class of compounds which may be used to form the synergistic blend, and that the present invention is not necessarily limited thereto.

The two components of the synergistic blend of the present invention, namely, the phosphorous-containing compound, either polymeric or monomeric in nature, the former being of the class of the polyaminoalkylenephosphonates and the latter being of the nitrillotriphosphonic acid type, and the quaternary ammonium chloride compound are admixed by any method known in the art, said admixture being by physical means including mixing, stirring, etc. As hereinbefore set forth, the compounds are present within a range of from about 90% to about 30% by weight of the phosphorous-containing compound and from about 10% to about 70% by weight of the quaternary ammonium chloride compound. Thereafter, the synergistic blend is added to the water system in an amount in the range of from about 1 to about 20 ppm of said mixture to the water content of the system.

The following examples are given to illustrate the ability of the blend of compounds to act in a synergistic fashion for increasing the saturation point of a polyvalent ion salt. However, these examples are given merely for purposes of illustration and are not intended to limit the generally broad scope of the present invention in strict accordance therewith.

EXAMPLE I

To illustrate the synergistic effect of the mixture of the present invention, a 1000 ppm solution as calcium carbonate of calcium nitrate was mixed with a 1000 ppm solution as calcium carbonate of sodium carbonate, the mixture producing a 500 ppm solution of calcium carbonate. Thereafter the scale control additive was added and the solution was allowed to stand for a period of 24 hours at various temperatures. Following this, the mixture was filtered and utilizing the EDTA test method for hardness, the filtrate was titrated for calcium content and the results were compared. In the first sample 4 ppm of polyaminomethylenephosphonate which was available as a commercial produce was added. This compound is designated as PAMP in the following table. In addition, another sample was treated with a quaternary ammonium chloride compound in an amount of four ppm, this quaternary ammonium chloride compound being poly[oxyethylene(dimethylimino)ethylene(dimethylimino)ethylenedichloroide]. This compound is designated in the following table as POED. A third sample contained the mixture comprising 4 ppm of PAMP and 4 ppm of POED. The three solutions were allowed to stand in the 500 ppm solution of calcium carbonate for a period of 24 hours while maintaining the temperature at 80° F., the pH of the solution being 10.3. Utilizing the aforementioned EDTA method for hardness, the results are set forth in Table I below:

TABLE I

| COMPOUND | PPM CALCIUM CARBONATE IN SOLUTION |
|---|---|
| Control | 50 |
| 4 ppm POED | 48 |
| 4 ppm PAMP | 152 |
| 4 ppm POED 4 ppm PAMP | 172 |

A second series of tests was performed utilizing the same combination, the results being set forth in Table II below:

TABLE II

| COMPOUND | PPM CALCIUM CARBONATE IN SOLUTION |
|---|---|
| Control | 66 |
| 4 ppm POED | 62 |
| 4 ppm PAMP | 168 |
| 4 ppm POED 4 ppm PAMP | 192 |

It will be noted from the above tables that the poly[oxyethylene(dimethyliminio)ethylene(dimethyliminio)ethylenedichloride] does not appear to extend the saturation point of the calcium carbonate and in fact appears to depress the saturation point of the calcium chloride to a slight extent. Therefore, it was totally unexpected that a combination of the polyaminomethylenephosphonate and the poly[oxyethylene(dimethyliminio)ethylene(dimethylimino)ethylenedichloride] produces a synergistic result in permitting the saturation point of the calcium carbonate in solution to be raised.

EXAMPLE II

In this example a second series of tests similar in nature to that set forth in Example I above were performed utilizing 6 ppm of the polyaminomethylenephosphonate in one test, 6 ppm of poly[oxyethylene(dimethyliminio)ethylene(dimethyliminio)ethylenedichloride] in a second test, and a combination of 6 ppm of each of the above compounds in a third test. The results are set forth in Table III below:

TABLE III

| COMPOUND | PPM CALCIUM CARBONATE IN SOLUTION |
|---|---|
| Control | 76 |
| PAMP | 212 |
| POED | 72 |
| 6 ppm PAMP 6 ppm POED | 236 |

Again the synergistic effect of the combination is shown inasmuch as the poly[oxyethylene(dimethyliminio)ethylene(dimethyliminio)ethylenedichloride] discloses a depression of the saturation point of the calcium carbonate.

EXAMPLE III

To illustrate that the proportions of the two components of the synergistic blend may vary over a range, another series of tests were run utilizing a 500 ppm calcium carbonate solution. In this series, 6 ppm of polyaminomethylenephosphonate was admixed with varying amounts of poly[oxyethylene(dimethyliminio)ethylene(dimethyliminio)ethylenedichloride] and the resulting solutions were allowed to stand for a period of 24 hours at a temperature of 70° F., the pH of the solution again being 10.3. The results of these tests are set forth in Table IV below:

TABLE IV

| COMPOUND | PPM CALCIUM CARBONATE IN SOLUTION |
|---|---|
| Control | 66 |
| 6 ppm POED | 62 |
| 6 ppm PAMP | 212 |
| 6 ppm PAMP | 216 |
| 0.5 ppm POED 6 ppm PAMP | 226 |
| 1 ppm POED 6 ppm PAMP | 230 |
| 2 ppm POED 6 ppm PAMP | 236 |
| 3 ppm POED 6 ppm PAMP | 246 |
| 6 ppm POED 6 ppm PAMP | 250 |
| 12 ppm POED | |

The results set forth in the above table again indicate that a synergistic effect resulted when the two compounds were admixed utilizing the poly[oxyethylene(dimethyliminio)ethylene(dimethyliminio)ethylenedichloride] in a wide range of concentrations ranging from approximately 10% to about 70% by weight.

EXAMPLE IV

In this example a commercial polyaminomethylenephosphonate (available under the tradename "Dequest 2000") as manufactured by the Monsanto Corporation was utilized as one component of the synergistic blend, being admixed in equal percentage with poly[oxyethylene(dimethyliminio)ethylene(dimethyliminio)ethylenedichloride]. As in the previous examples, a series of 4 tests was run using a control for one, 6 ppm of poly[oxyethylene(dimethyliminio)ethylene(dimethyliminio)ethylenedichloride] in a second, 6 ppm of polyaminomethylenephosphonate in a third, and a mixture of 6 ppm of the polyaminomethylenephosphonate and poly[oxyethylene(dimethylimino)ethylene(dimethyliminio)ethylenedichloride] in a fourth. As in the previous examples, the results show that there were 68 ppm of calcium carbonate in solution in the control, 62 ppm of calcium carbonate using only poly[oxyethylene(dimethyliminio)ethylene(dimethyliminio)ethylenedichloride], 244 ppm of calcium carbonate when using the polyaminomethylenephosphonate alone and 264 ppm of calcium carbonate in solution when using a combination of the two compounds. This clearly indicates that the poly[oxyethylene(dimethyliminio)ethylene(dimethyliminio)ethylenedichloride] acts in a synergistic manner when combined with the polyaminomethylenephosphonate to elevate the saturation point of the calcium carbonate.

EXAMPLE V

When a quaternary ammonium salt such as poly[oxyethylene(dimethyliminio)ethylene(dimethyliminio)ethylenedichloride] is utilized in combination with other polyaminoalkylenephosphonates such as polyaminoethylenephosphonate and polyaminopropylenephosphonate as well as with nitrillotrimethylenephosphonic acid, it will be found that the combination exhibits a synergistic effect in elevating the saturation point of polyvalent ion salts such as calcium carbonate which cause scale in water circulation systems, this synergistic effect being totally unexpected in view of the fact that the quaternary ammonium salt reduces or depresses the saturation point of the calcium carbonate.

I claim as my invention:

1. The synergistic mixture of from about 90% to about 30% by weight of a polyaminoalkylenephosphonate in which the alkylene group is methylene, ethylene or propylene and from about 10% to about 70% by weight of poly[oxyethylene(dimethyliminio)ethylene(dimethyliminio)ethylenedichloride].

2. The synergistic mixture as set forth in claim 1 in which said polyaminoalkylenephosphonate is polyaminomethylenephosphonate.

3. The synergistic mixture as set forth in claim 1 in which said polyaminoalkylenephosphonate is polyaminoethylenephosphonate.

4. The synergistic mixture as set forth in claim 1 in which said polyaminoalkylenephosphonate is polyaminopropylenephosphonate.

5. The method of controlling scale deposits in a water recirculating system which comprises adding thereto the synergistic mixture of claim 1.

6. The method as set forth in claim 5 in which said synergistic mixture is present in said system in an amount in the range of from about 1 to about 20 ppm.

* * * * *